United States Patent [19]

Jones

[11] Patent Number: 5,182,663

[45] Date of Patent: Jan. 26, 1993

[54] LIQUID CRYSTAL DISPLAY HAVING IMPROVED RETROREFLECTOR

[75] Inventor: Philip J. Jones, Menlo Park, Calif.

[73] Assignee: Raychem Corporation, Menlo Park, Calif.

[21] Appl. No.: 752,729

[22] Filed: Aug. 30, 1991

[51] Int. Cl.$^5$ .............................................. G02F 1/12
[52] U.S. Cl. ...................................... 359/70; 359/247; 359/529
[58] Field of Search .................. 359/70, 71, 69, 247, 359/529, 530, 532; 340/767

[56] References Cited

U.S. PATENT DOCUMENTS

| | | | |
|---|---|---|---|
| 3,905,682 | 9/1975 | Meyerhofer | 359/70 |
| 4,266,859 | 5/1981 | Togashi | 359/70 |
| 4,298,249 | 11/1981 | Gloor et al. | 359/70 |
| 4,588,258 | 5/1986 | Hoopman | 359/532 |
| 4,693,560 | 9/1987 | Wiley | 359/53 |
| 4,703,999 | 11/1987 | Benson | 359/532 |
| 4,726,662 | 2/1988 | Cromack | 359/49 |
| 4,732,456 | 3/1988 | Fergason et al. | 359/51 |
| 4,775,219 | 10/1988 | Appeldorn et al. | 359/532 |
| 4,883,903 | 1/1990 | Thakar et al. | 359/70 |
| 4,983,021 | 1/1991 | Fergason | 359/36 |
| 4,991,940 | 2/1991 | Dalisa et al. | 359/70 |

FOREIGN PATENT DOCUMENTS

0421810A2  4/1991  European Pat. Off. .

*Primary Examiner*—William L. Sikes
*Assistant Examiner*—Huy K. Mai
*Attorney, Agent, or Firm*—Yuan Chao; Herb Burkard

[57] ABSTRACT

A reflective liquid crystal display includes a retroreflector made of an array of full corner cube elements which have their optic axes tilted away from the normal to the plane of the display by an angle of between about 10° and about 45°.

20 Claims, 4 Drawing Sheets

LIQUID CRYSTAL DISPLAY HAVING IMPROVED RETROREFLECTOR

BACKGROUND OF THE INVENTION

This invention relates to a liquid crystal display having an improved retroreflector.

Reflective liquid crystal displays, comprising a liquid crystal-based electrooptically active element placed in front of a reflector, are well known in the art. The electrooptically active element transitions between a first and a second optical state in response to an input such as an electrical signal. Light incident on the display does or does not reach the reflector depending on the optical state and accordingly is or is not reflected by the reflector, thereby providing different viewing states to the observer. Reflective liquid crystal displays find many applications, an example of which is a screen in portable or "laptop" computers, on account of their light weight and low power consumption.

A type of liquid crystal display employs encapsulated liquid crystal material, in which liquid crystals are encapsulated or dispersed in a matrix (or containment medium) which can be a polymer. When a voltage corresponding to a sufficiently strong electric field is applied across the encapsulated liquid crystal material (the "field-on" condition), the alignment of the liquid crystals is re-oriented in accordance with the field, so that incident light is transmitted. Conversely, in the absence of such a voltage (the "field-off" condition) the alignment of the liquid crystals is random and/or influenced by the liquid crystal-matrix interface, so that the liquid crystal material scatters incident light. The applied voltage at which the liquid crystal material begins to change from its field-off condition to its field-on condition is called the threshold voltage.

The nature of the reflector has an important effect on viewing quality. In the field-off condition, the display desirably appears bright or paper-white, due to scattering of light towards the viewer. If a specular (mirror-like) reflector is used, good darkness can be obtained in the field-on condition, but images of objects in the room may be reflected to the viewer, producing glare, especially where there are strong point light sources such as light non-diffuse light fixtures. Alternatively, diffuse reflectors have been proposed. While reducing the aforementioned disadvantage, they have the limitation of also reducing contrast. An improved display is obtained where the reflector is a retroreflector, because such a reflector retro-reflects light back towards the source instead of specularly, thus avoiding the glare problem associated with specular reflectors, and at the same time producing high contrast, unlike displays having diffuse reflectors. The use of retroreflectors in liquid crystal displays is disclosed in Meyerhofer, U.S. Pat. No. 3,905,682 (1975).

Thorn EMI, EP 421810 (1991), discloses a liquid crystal display having a directional reflector comprising a faceted sheet of refracting material and a layer of optically absorbing material separated from the refracting material by a substance whose refractive index is lower than that of the refracting material, for example air.

Cromack, U.S. Pat. No. 4,726,662 (1988), discloses a liquid crystal display including a prismatic lens system or a prismatic reflective system. The prismatic reflective system embodiment comprises a plurality of right-angle reflectors and light absorbing targets. Depending on whether the incident light is inside or outside the viewing cone, it is either reflected towards the targets (and absorbed thereby) or towards the viewer.

Fergason et al., U.S. Pat. No. 4,732,456 (1988), discloses a display with enhanced contrast in which a lens or reflector means is used to direct light transmitted by the display onto a light absorbing target.

Wiley, U.S. Pat. No. 4,693,560 (1987), discloses a double layer display comprising a front and a rear liquid crystal cell, a transflector which partially reflects and partially transmits incident light disposed between the two cells, and a backlight source behind the rear cell. Under dark ambient conditions, the display operates as a backlit transmissive display. Under bright ambient conditions, the display operates as a reflective display comprising the front cell and the transflector.

Dalisa et al., U.S. Pat. No. 4,991,940 (1991), discloses a reflective liquid crystal display in which an off-set gain reflector is used to separate the directions of the gain and glare light.

Copending commonly assigned application Ser. No. 752,381, entitled "Multipurpose Liquid Crystal Display" and filed even date herewith, of Kamath et al., discloses a liquid crystal display having a removable retroreflector, which display can be interchangeably used as a conventional display (e.g., computer screen) and as an overhead projection panel. The disclosure of this application is incorporated herein by reference.

SUMMARY OF THE INVENTION

This invention provides a liquid crystal display comprising (a) a first transparent electrode means; (b) a second transparent electrode means; (c) a display medium positioned between the first and second transparent electrode means, which display medium is switchable between a first state in which incident light is scattered and a second state in which the amount of such scattering is reduced; and (d) a retroreflector positioned behind the second transparent electrode means, which retroreflector comprises an array of full corner cube elements and has an optic axis tilted away from the normal to the plane of the display by an angle of between about 10° and about 45°. The display medium preferably comprises positive dielectric anisotropy, operationally nematic liquid crystals dispersed in a containment medium.

DESCRIPTION OF THE PREFERRED EMBODIMENTS

In a display combining encapsulated liquid crystal material and a retroreflector, the display's brightness and contrast are strongly influenced by the type of retroreflector used. I have discovered that simply positioning a conventional retroreflector behind the encapsulated liquid crystal material is insufficient to provide a display of desirable brightness and contrast. The retroreflector can affect the darkness of the display in the field-on condition as well as the brightness of the display in the field-off condition, both factors important in determining the overall quality of the display.

Figure 1A:
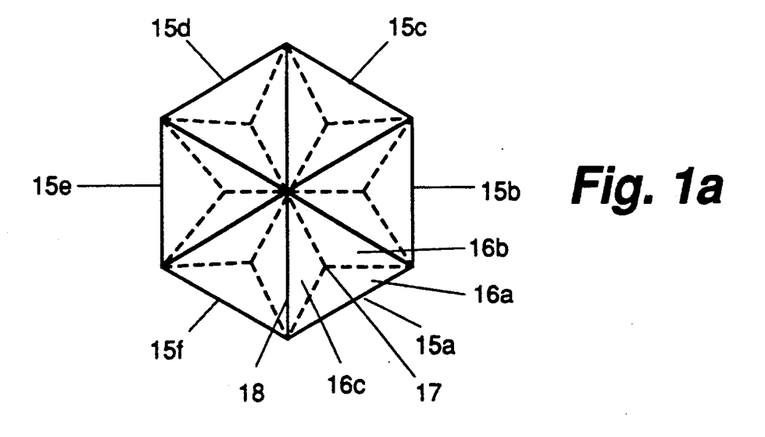
FIGS. 1a–b show an array of orthogonal corner cube elements for a retroreflector of this invention.
Figure 1B:
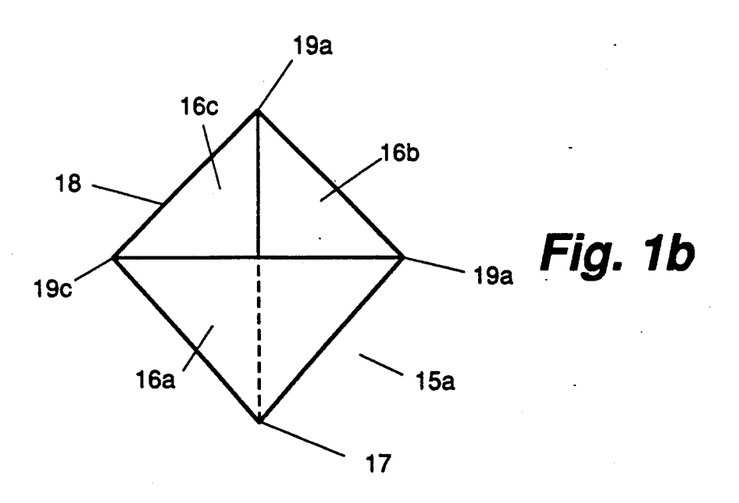

Regarding display darkness in the field-on condition, if a viewer looks at the display with a light source behind his head then, the desired effect is that none of the light from the light source passing through the encapsulated liquid crystal material in the field-on state and impinging on the retroreflector is retroreflected in a manner such that it is perceived by the viewer's eyes. For a typical viewing distance of 60 cm and a typical eye-to edge distance of 6 cm, this objective is accomplished if practically no light is retroreflected outside a 6° cone. A preferred type of retroreflector having these characteristics comprises an array of accurate, orthogonal corner cube elements. By a full corner cube element, it is meant it is meant a reflective element consisting of three orthogonal reflective faces. Such corner cube elements are depicted in FIGS. 1a-b. A corner cube element may be visualized as that the three-faced pyramid produced by sectioning off a corner of a cube. Such elements can be arranged in an array, to produce a retroreflector. FIG. 1a shows in a top view a hexagonal array of six corner cube elements 15a-f. Referring to FIG. 1b, it shows in plan view representative element 15a, comprising three faces 16a-c meeting at apex 17. To prevent scattering by the top edges of the corner cube element (i.e., where an orthogonal surface of one corner cube element intersects the orthogonal surface of another corner cube element, of which edge 18 is representative), it may be desirable to ensure that they are sharp or covered with a dark, absorbing material. Further, apex 17 may be similarly treated to make it non-reflective.

Figure 2:
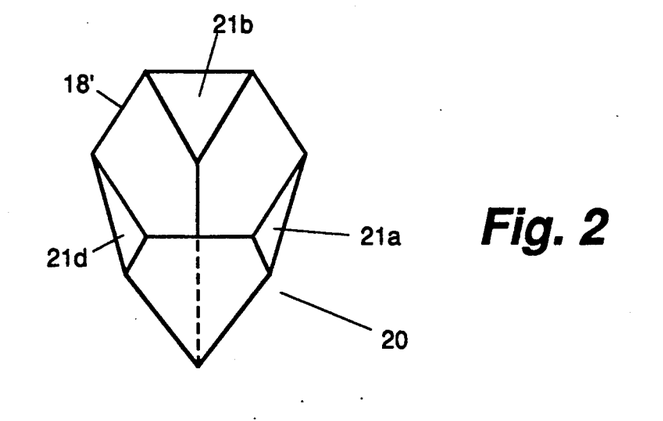
FIG. 2 shows a truncated corner cube having areas susceptible to stray reflections.

Additionally, the retroreflector preferably does not produce any spurious reflections from areas thereof which are not active retroreflective surfaces. For example, in a corner cube retroreflector which does not have accurate orthogonal corner cube elements but has instead truncated corner cube elements (which may be visualized as the corner cube elements of FIGS. 1a-b with their corners sectioned off) or which has rounded edges, the non-retroreflecting areas should be masked off by coating them with an absorbing coating or placing an absorbing layer behind the retroreflector if the latter is transparent. An illustration of a truncated corner cube array and how its performance can be improved is shown in FIG. 2. Truncated corner cube element 20 can be visualized as corner cube 15a with the three corners 19a-c sectioned off, to produce new faces 21a-c. Edge 18' corresponds to edge 18 in corner cube 15a and is provided for visual reference purposes. It is noted that corner cube element 20 also has a hexagonal aspect, again permitting maximal packing efficiency. Generally, it is desired that the non-active areas of the retroreflector, i.e., those areas which are not directly active in reflecting or refracting light beams in the retroreflective process, be minimized in size and/or covered or masked with a non-reflective material.

Figure 3A:
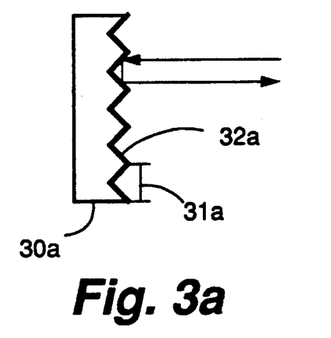
FIGS. 3a–d show various modes of operation of retroreflectors.
Figure 3B:
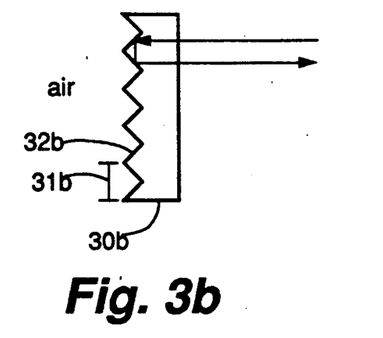
Figure 3C:
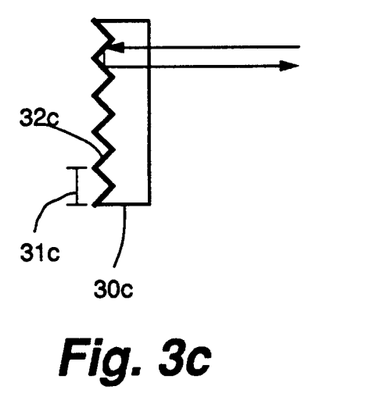
Figure 3D:
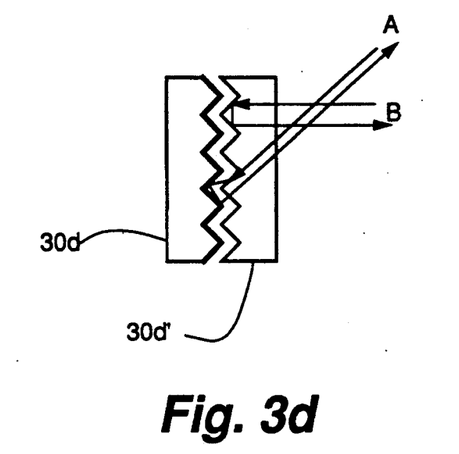

A corner cube retroreflector (sometimes also referred to in the art as a "cube corner" reflector) can operate either by the principle of total internal reflection or by simple specular reflection, or both. FIGS. 3a-d show four types of corner cube retroreflectors usable in this invention. FIG. 3a shows a front-surface retroreflector 30a made of an array of corner cube elements 31a, each having three orthogonal specularly reflective surfaces 32a, for example made by metallizing a substrate surface with aluminum, silver, gold, or some other metal. Light incident on one of the orthogonal surfaces of a corner cube element 31a is reflected at each orthogonal surface 32a and thence back in the direction from which it came. (There being three orthogonal surfaces, there are a total of three reflections, but for convenience of representation in a two-dimensional drawing, only two reflections are shown in the figure.) FIG. 3b shows a rear-surface retroreflector 30b which operates by the principle of total internal reflection. Retroreflector 30b is made of a transparent material and comprises corner cube elements 31b positioned at its rear surface, i.e., away from the light source. Behind retroreflector 30b is a medium of lower refractive index, typically air. When a light ray strikes one of the orthogonal surfaces 32b of corner cube element 31b, it is reflected to another orthogonal surface 32b by the principle of total internal reflection, and, after three such reflections, back in the direction from which it came. FIG. 3c shows a rear-surface retroreflector 30c, in which the corner cube elements 31c are positioned at the rear and in which the orthogonal reflective surfaces 32c are specularly reflective as in retroreflector 30a. A more efficient retroreflector can be obtained by combining the specular and total internal reflection modes of operation. Such a retroreflector is shown in FIG. 3d. The rear half comprises a retroreflector 30d operating by specular reflection, such as previously shown in FIG. 3a. The front half comprises a retroreflector 30d' operating by the principle of total internal reflection, such as previously shown in FIG. 3b. A light which strikes retroreflector 30d' at an angle too oblique to be totally internally reflected (e.g., ray A) is refracted towards retroreflector 30d and, if striking the latter at an angle within its acceptance cone, is retroreflected thereby. Conversely, light which strike retroreflector 30d' at an angle within its acceptance cone (e.g., ray B) is retroreflected thereby. Such combination retroreflectors, which may be described as retroreflectors in which the rear surface is configured with corner cube reflective elements and a specularly reflective surface shaped as a negative of the corner cube reflective elements is placed in a closely spaced mating relationship with the rear surface, are discussed in more detail in Benson, U.S. Pat. No. 4,703,999 (1987), the disclosure of which is incorporated by reference.

Turning now to the brightness of the display in the field-off condition, it is preferred that the resultant brightness be at least 60% that of ordinary white paper. The brightness is determined by the fraction of the reflector surface which is retroreflective (assuming that the non-retroreflective areas have been masked off as described above) and the reflectivity of the retroreflecting surfaces themselves.

For a retroreflector having full corner cube elements and relying on the principle of critical angle reflection from the dielectric/air interfaces close to 100% retroreflectivity can be achieved, but only for light incident within an acceptance cone which is about ±21° from normal. In an uniformly lit room this means that only about 7% of the incident light would be retroreflected, as shown by the relationship $$\% \text{ light retroreflected} = 100\% (1 - \cos 21°)$$

In contrast, retroreflectors having full corner cube arrays but having specular coatings of aluminum on the retroreflectively active surfaces have a lower retroreflective efficiency, about 61% (three reflections at about 85% efficiency each), but a larger acceptance cone, about ±45° from normal. In a uniformly light room a somewhat larger percentage of the incident light would be reflected, about 18%

% light retroreflected = 61% (1 − cos 45°)

By using a more reflective material, such as silver (efficiency about 92% per reflection), the percentage of light retroreflected could be increased somewhat, to about 23%.

By combining a dielectric/air and a silver coated corner cube construction, as discussed in connection with FIG. 3d supra, a further improvement in the percentage of incident light retroreflected can be obtained, to about 24%:

% light retroreflected = 100% (1 − cos 21°) + 78% (cos 21° − cos 45°)

Even so, it can be seen that the improvement is modest. Generally, it is not feasible to make retroreflectors having significantly greater efficiencies.

However, I have discovered that it is possible to make displays having significantly improved brightness by taking advantage of the fact that, in most rooms the light is not truly uniform, but usually directed within a ±50° cone. For example, if a retroreflector had an acceptance cone of 45° and the predominant light source in the room produced light within a cone of ±50°, the amount of light retroreflected could rise to about 67%.

% light retroreflected =

$$\frac{100\%(1 - \cos 21°) + 78\%(\cos 21° - \cos 45°)}{1 - \cos 50°}$$

Figure 4A:
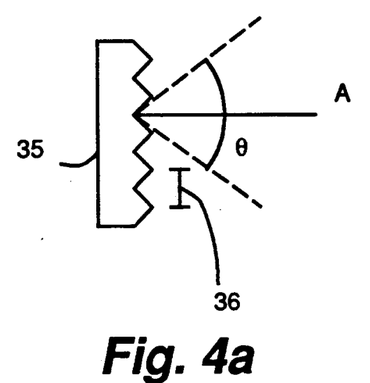
FIGS. 4a–b and 5a–b show how tilting the optical axis of a retroreflector leads to a display with improved contrast.
Figure 4B:
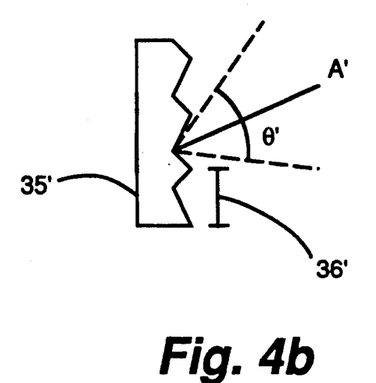

The fraction of light retroreflected can be maximized by tilting the optical axis by 10° to 45° of the retroreflector to match the orientation of the predominant light source, so that more of the incident light will be captured in the corner cube's acceptance cone. (The optic axis of a corner cube retroreflector is the line defined by the points equidistant from each of the three orthogonal faces.) A retroreflector with a tilted optic axis may be achieved by simply tilting each of the retroreflector elements in an array, as shown in FIGS. 4a–b. In FIG. 4a, a retroreflector 35 has an optic axis A normal to its plane (θ being its acceptance cone) as each of its retroreflecting elements 36 is oriented in a conventional manner. FIG. 4b shows a retroreflector 35' having an optic axis A' (θ' being its acceptance cone) tilted away from normal, as a result of the each of retroreflecting elements 36' being tilted. The preparation of corner cube reflectors having tilted optic axes is described in Hoopman, U.S. Pat. No. 4,588,258 (1986) and Appeldorn et al., U.S. Pat. No. 4,775,219 (1988), the disclosures of which are incorporated herein by reference.

Figure 5A:
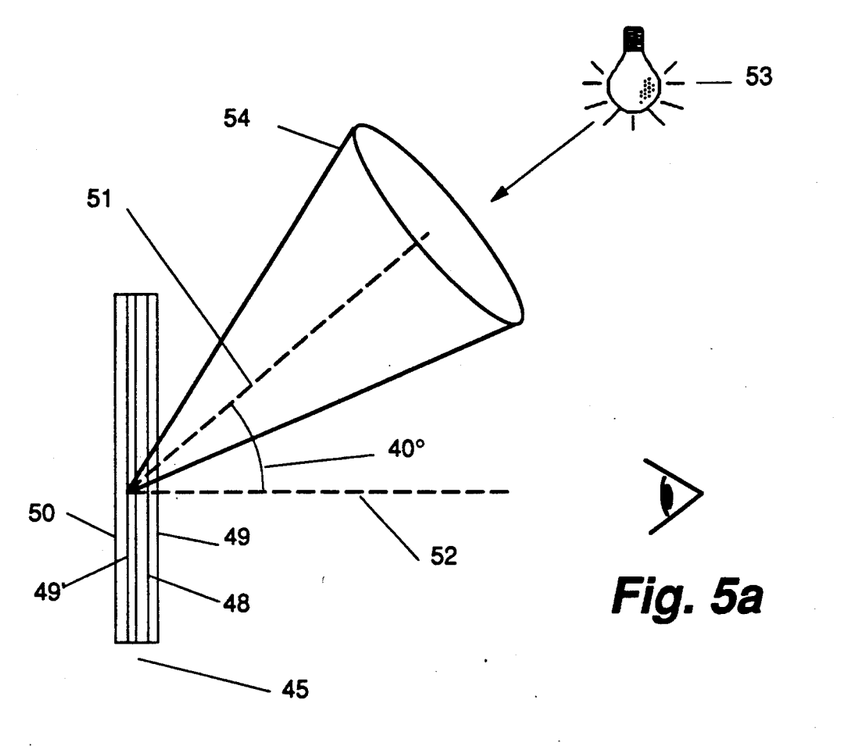
Figure 5B:
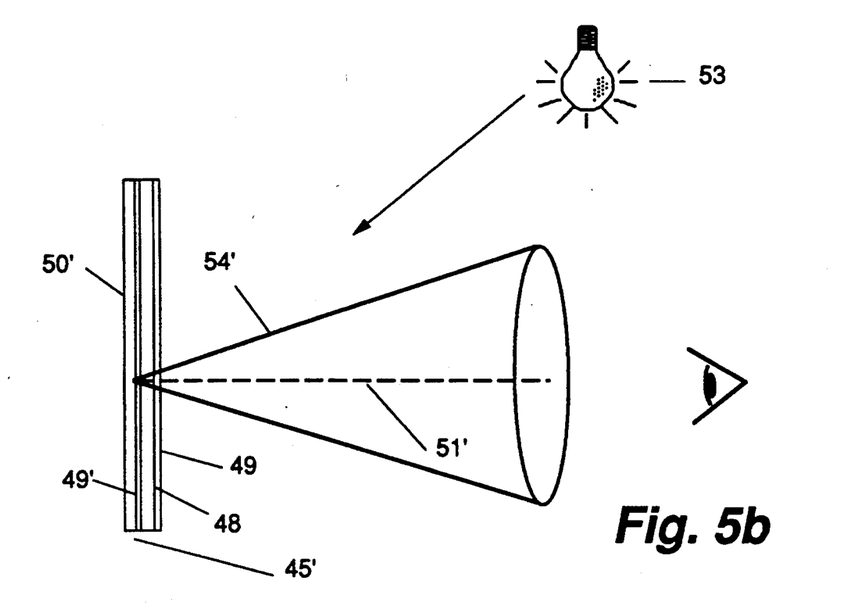

Schematically, the effect of this tilting of the optic axis is shown in FIGS. 5a–b. In FIG. 5a display 45 includes an electrooptical element 48 made of encapsulated liquid crystal material, first and second transparent electrodes 49 and 49' sandwiching electrooptical element 48, and a retroreflector 50 whose optic axis 51 is tilted upwards by about 40° from normal line 52 to the plane of display 45, towards the anticipated predominant direction from which light will impinge on the display during the course of ordinary use. Typically, the predominant light source will be a ceiling fixture 53, situated above the viewer, so that the tilt in optic axis 51 will normally be upwards. As a result, light rays from fixture 53 will largely fall within acceptance cone 54 of retroreflector 50 and be retroreflected thereby and away from the viewer, increasing display darkness in the field-on condition. Comparison is made with display 45' of FIG. 5b (numerals identically repeated from FIG. 5a designating like elements), which is similar to display 45 of FIG. 5a, except for retroreflector 50', whose optical axis 51' is not tilted in accordance with this invention but instead is oriented in a conventional manner, normal to the plane of the display. Consequently, light rays from fixture 53 will generally fall outside of acceptance cone 54', so that they will not be retroreflected by retroreflector 50'. A significant number of the light rays will may be specularly reflected or scattered towards the viewer, decreasing display darkness in the field-on condition and consequently the contrast.

Accordingly, a display of this invention combines a narrow retroreflectivity cone, of less than 6°, and a tilt in its optical axis by between 10° and 45°. For displays designed to be viewed in a substantially perpendicular orientation, the amount of tilt should be on the high side, preferably between 30° and 45°. For displays designed to be viewed while positioned horizontally, e.g., laid flat on a table, the amount of tilt can be relatively low, preferably between 10° and 20°. Further, those areas of the retroreflector which can cause spurious reflections are preferably masked off with a light absorbing material.

Turning now to the display medium, it preferably comprises encapsulated liquid crystal material itself, its preparation is disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; and U.S. Pat. No. 4,688,900 (1987) to Doane et al.; the disclosures of each which are incorporated herein by reference. In encapsulated liquid crystal material discrete volumes of liquid crystals are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystals appear to form a continuous phase, as described in Dainippon Ink and Chemicals, published European patent application EP 0,313,053 (1989). "Liquid crystals" denotes a composition having liquid crystalline properties, whether that composition is a single discrete liquid crystalline compound, a mixture of different liquid crystalline compounds, or a mixture of liquid crystalline and non-liquid crystalline compounds. Preferably, the liquid crystals are nematic or operationally nematic. More preferably, they also have a positive dielectric anisotropy.

Liquid crystals have typically elongated molecular shapes, with a tendency to align or orient themselves with their long molecular axes parallel to each other.

This alignment causes liquid crystals to be anisotropic, meaning that their measured physical, optical, and other properties are dependent on the direction of measurement (parallel or perpendicular to the direction of alignment). Further, the alignment direction can be influenced by an external stimulus, such as an electrical or magnetic field, causing the liquid crystals to exhibit a particular value of a physical characteristic in one direction when the stimulus is absent, but rapidly switching to a different value when the stimulus is applied. It is because of their anisotropy and their ready realignment that liquid crystals are useful as materials for displays.

The containment medium is preferably a polymeric material. Suitable containment media include but are not limited to poly(vinyl alcohol) and poly(vinyl alcohol) copolymers, gelatin, polyurethane, poly(ethylene oxide), poly(vinyl pyrrolidone), cellulosic polymers, natural gums, acrylic and methacrylic polymers and copolymers, epoxies, polyolefins, vinyl polymers, and the like. Poly(vinyl alcohol) is a preferred containment medium.

Encapsulated liquid crystal material can be formed by deposition from an emulsion containing both the containment medium and liquid crystals or by the evaporation of liquid from a solution containing both containment medium and liquid crystals. It can also be formed by making an initially homogeneous mixture containing both containment medium and liquid crystals at an elevated temperature, then cooling to phase-separate out liquid crystal volumes contained in the containment medium. Further, it can be formed by an in-situ polymerization process, in which the containment medium is polymerized and simultaneously encapsulates liquid crystal material. The liquid crystal need not be entirely surrounded by the polymer, and may exist as part of a system with co-continuous phases.

Typically, encapsulated liquid crystal material is substantially non-transparent in the absence of a sufficient electric field (the "field-off" state) and substantially transparent in the presence of a sufficient electric field (or "field-on" state). The electric field induces a change in the alignment of the liquid crystals, in turn causing the encapsulated liquid crystal material to switch from a highly light-scattering (and/or absorbent) state to a highly non-scattering and substantially transparent state. Generally, it is preferred that the liquid crystals have a positive dielectric anisotropy and that the ordinary index of refraction of the liquid crystals be matched with the refractive index of the containment medium, while the extraordinary index of refraction is substantially mismatched therewith. The physical principles by which such encapsulated liquid crystal material operates is described in further detail in the aforementioned references, particularly the patents to Fergason. In those portions of the encapsulated liquid crystal material to which a sufficient electric field is applied, the transition from a non-transparent state to a transparent state occurs, while adjacent areas to which no electric field has been applied remain non-transparent.

It is known to include pleochroic dyes into the liquid crystals of the encapsulated liquid crystal material. However, for the practice of our invention it is preferred that the encapsulated liquid crystal material be substantially free of included dye, pleochroic or otherwise.

While the display medium is preferably made of encapsulated liquid crystal material, other types of scattering liquid crystal displays, for example smectic A, cholesteric, or dynamic scattering nematic displays, may also be employed.

Figure 6A:
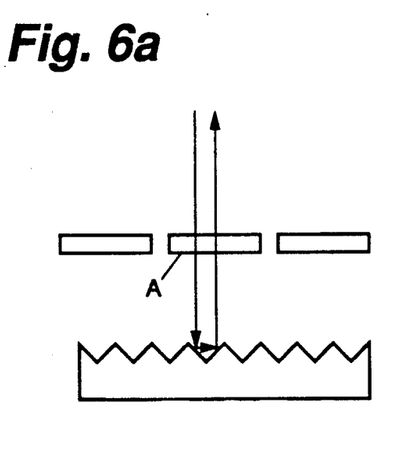
FIGS. 6a–b show a preferred and a less preferred combination of the relative sizes of the retroreflector elements and the pixels in a display of this invention.
Figure 6B:
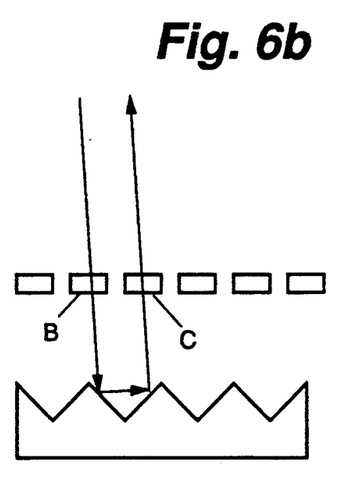

For best results, it is desirable that the pixel pitch be greater than the pitch of the retroreflective elements in the retroreflector (keeping in mind that pixel pitch may be different in the x and y directions, and that this preference applies to both the x and y directions). The reason is that, by the nature of a retroreflector, a incident ray of light is displaced parallel (or substantially so) to its incoming path as it is redirected back towards the source. If this results in a ray of light incoming and exiting through different pixels, this may be undesirable, as illustrated in FIG. 6a and 6b. FIG. 6a shows the more desired embodiment in which the pixel pitch is greater than the pitch of the retroreflector elements. Consequently, an incident light ray will (or at least is highly likely to) enter and exit through the same pixel, i.e. the pixel labeled A. Conversely, in FIG. 6b, the pixel pitch is smaller than the pitch of the retroreflector elements, so that an incoming ray of light may enter via pixel B but exit via pixel C. This is undesirable where pixel C has different attributes from pixel B, for example is "off" while pixel B is "on" or is green while pixel B is red. Preferably, the pitch of the retroreflector elements is a submultiple (e.g., $\frac{1}{2}$, $\frac{1}{3}$) of the pixel pitch. An alternative preferred size relationship is for the retroreflector elements to be substantially smaller than the size of the pixels and to be packed with some degree of randomness.

Generally, it is preferred that, in a reflective display, there be substantially no gap between the reflector and the bottom electrode, to minimize parallax effects. However, a slight gap is often an incident of the manufacturing process, because gapped displays are easier to manufacture. An advantage of the displays of this invention is that, because of the optical nature of a retroreflector, the display is more tolerant of the presence of a gap, without incurring undesirable parallax effects, thereby permitting greater convenience in manufacturing and product design.

What is claimed is:

1. A liquid crystal display comprising (a) a first transparent electrode means; (b) a second transparent electrode means; (c) a display medium positioned between the first and second transparent electrode means, which display medium is switchable between a first state in which incident light is scattered and a second state in which the amount of such scattering is reduced; and (d) a retroreflector positioned behind the second transparent electrode means, which retroreflector comprises an array of full corner cube elements and has an optic axis tilted towards the top of the display by an angle of between about 10° and about 45°.

2. A display according to claim 1, wherein the optic axis of the retroreflector is tilted by between about 10° and about 20°.

3. A display according to claim 1, wherein the optic axis of the retroreflector is tilted by between about 30° and about 45°.

4. A display according to claim 1, wherein the retroreflector is a front surface retroreflector whose corner cube elements are specularly reflective.

5. A display according to claim 1, wherein the retroreflector is a rear surface retroreflector whose corner cube elements reflect by total internal reflection.

6. A display according to claim 1, wherein the retroreflector is a rear surface retroreflector whose corner cube elements are specularly reflective.

7. A display according to claim 1, wherein the retroreflector comprises a front half which is a rear surface retroreflector whose corner cube elements reflect by total internal reflection and a rear half which is a front surface retroreflector whose corner cube elements are specularly reflective.

8. A display according to claim 1, wherein in the corner cube elements the intersection of an orthogonal face of one corner cube element with an orthogonal face of another corner cube element are masked with a dark, light absorbing material.

9. A display according to claim 1, wherein in the corner cube elements, the apices of the corner cubes are masked with a dark, light absorbing material.

10. A display according to claim 1, wherein the pixel pitch in the display medium is greater than the pitch of the retroreflective elements in the retroreflector.

11. A display according to claim 1, wherein the display medium comprises positive dielectric anisotropy, operationally nematic liquid crystals dispersed in a containment medium.

12. A display according to claim 11, wherein the optic of the retroreflector axis is tilted by between about 10° and about 20°.

13. A display according to claim 11, wherein the optic axis of the retroreflector is tilted by between about 30° and about 45°.

14. A display according to claim 11, wherein the retroreflector is a front surface retroreflector whose corner cube elements are specularly reflective.

15. A display according to claim 11, wherein the retroreflector is a rear surface retroreflector whose corner cube elements reflect by total internal reflection.

16. A display according to claim 11, wherein the retroreflector is a rear surface retroreflector whose corner cube elements are specularly reflective.

17. A display according to claim 11, wherein the retroreflector comprises a front half which is a rear surface retroreflector whose corner cube elements reflect by total internal reflection and a rear half which is a front surface retroreflector whose corner cube elements are specularly reflective.

18. A display according to claim 11, wherein in the corner cube elements the intersection of an orthogonal face of one corner cube element with an orthogonal face of another corner cube element are masked with a dark, light absorbing material.

19. A display according to claim 11, wherein in the corner cube elements, the apices of the corner cubes are masked with a dark, light absorbing material.

20. A display according to claim 11, wherein the pixel pitch in the display medium is greater than the pitch of the retroreflective elements in the retroreflector.

* * * * *

UNITED STATES PATENT AND TRADEMARK OFFICE
CERTIFICATE OF CORRECTION

PATENT NO. : 5,182,663
DATED : Jan. 26, 1993
INVENTOR(S) : Philip J. Jones

It is certified that error appears in the above-indentified patent and that said Letters Patent is hereby corrected as shown below:

Column 3, line 21, delete the first occurrence of "it is meant".

Column 4, line 40, replace "strike" by --strikes--.

Column 4, line 64, replace "an uniformly" by --a uniformly--.

Column 6, line 21, delete "may".

Column 6, line 46, after "each" insert --of--.

Column 7, line 64, replace "of" by --or--.

Column 8, line 8, replace "a incident" by --an incident--.

Col. 9, claim 12, line 2, after "optic" insert --axis--

Signed and Sealed this

Twenty-second Day of March, 1994

Attest:

BRUCE LEHMAN

*Attesting Officer*      *Commissioner of Patents and Trademarks*